United States Patent Office 3,697,461
Patented Oct. 10, 1972

3,697,461
COATING MATERIALS FOR THE PRODUCTION
OF ELECTRODEPOSITABLE COATINGS
Gottfried Troeger, Hiltrup, Gerhart Hermann Mueller
and Gerhard Bachmann, Ludwigshafen, Herbert Spoor,
Limburgerhof, and Wolfgang Batzill, Ludwigshafen,
Germany, assignors to Badische Anilin- & Soda-Fabrik
Aktiengesellschaft, Ludwigshafen (Rhine), Germany
No Drawing. Filed Jan. 22, 1970, Ser. No. 5,136
Claims priority, application Germany, Jan. 25, 1969,
P 19 03 703.7
Int. Cl. C08g 5/20
U.S. Cl. 260—19 U                              13 Claims

ABSTRACT OF THE DISCLOSURE

Coating materials for the production of coatings on metal substrates by electrodeposition.

These coating materials contain, as binder dissolved or dispersed in water, a mixture of a conventional phenol resin and a copolymer (partly in the form of a salt) which contains units of an acrylic or methacrylic ester, at least one copolymerizable $\alpha,\beta$-olefinically unsaturated carboxylic acid having three to five carbon atoms, acrylamide or methacrylamide or their methylolation products (which may be etherified) and at least one oil containing an olefinically unsaturated fatty acid.

The coating materials according to the invention are suitable for coating metal articles, particularly for priming automobile bodies.

---

The present invention relates to coating materials for the production of electrodepositable coatings which contain, as binder dissolved or dispersed in water, a mixture of a phenolic resin and a copolymer (partly in the form of a salt) based on an acrylic ester or methacrylic ester and an oil containing an olefinically unsaturated acid.

It is known that coatings, particularly baking finishes, can be prepared on electrically conducting surfaces, particularly metal substrates, by electrochemically depositing the polymer from an aqueous solution or dispersion of a salt of a carboxylic acid anionic polymer onto the article to be coated which is made the anode, and then baking the coating. Thus it is known for example that copolymer of acrylic esters, methacrylic esters, acrylamides, methacrylamides, vinylaromatics and acrylic and methacrylic acids in the form of their salts in combination with polymers containing methylol groups may be used as such electrodepositable coating materials and give a crosslinkable coating upon being baked. Where as acrylate resins which are combined with condensates of melamine and formaldehyde containing methylol groups usually give colorless coatings when baked, which makes this combination suitable as one-coat finishes which can be pigmented in light shades, acrylate resins in combination with phenolformaldehyde condensates containing methylol groups usually tend to yellow when baked. The latter can therefore only be used as one-coat finishes which can usually be pigmented only in dark shades, but because of their excellent resistance to corrosion they are particularly suitable for primers. The physical properties of the coating may be varied to a certain extent by appropriate choice of the monomers. Thus for example the softness of the polymer film obtained therefrom may be increased by raising the content of acrylic ester or by using an acrylic ester of an alcohol having a longer carbon chain. On the other hand branching of the chain, for example replacement of the acrylic esters by corresponding methacrylic esters or replacement of a linear acrylic ester by the corresponding branched acrylic ester, results in a considerably harder and more brittle coating. Choice of the monomers and of their proportions for the porduction of the coplymers thus makes it possible to manufacture coatings having good physical properties. It has been found however that these coatings have an unfavorable hardness to impact strength ratio. Moreover, baths prepared with such products are wanting particularly as regards their throwing power which is very important in paint plating. By "throwing power" we mean the ability of the bath to coat an electrically conducting part not only on the side facing the counter-electrode but also on the side opposite the counter-electrode, for example the inside of a hollow article. Since an improvement in the throwing power can be achieved by raising the voltage applied in the bath, the latter should not react to changes in the voltage by decomposing. Another criterion for electropainting is the stability of the bath, i.e. under the conditions prevailing in the bath during plating there should be no coagulation or premature crosslinking of the binder.

It is also known that drying oils (cf. U.S. Pat. specification No. 2,574,753 and French patent specification No. 959,022) and oil-modified alkyd resins (Farbe und Lack, 60, 187 (1954)) can be copolymerized with $\alpha,\beta$-ethylenically unsaturated compounds, such as styrene, acrylonitrile, acrylic esters and methacrylic esters, and that the products thus obtained are suitable for the production of coatings from organic solutions or without solvents by conventional application methods. Oil-containing copolymers hitherto described, however, have been unsuitable for electrodeposition because they are either not sufficiently soluble in water or baths prepared therewith, as in the case of the abovementioned oil-free acrylate resins, do not have the necessary properties, such as throwing power, insensitivity to changes in voltage and stability, and do not give coatings having the necessary properties such as uniform flow, good adhesion to any subsequent coating and a favorable ratio of hardness to impact strength.

An object of the invention is to provide coating materials which can be applied particularly advantageously by electrodeposition. Baths prepared with these coating materials should be adequately stable and insensitive to changes in voltage and exhibit the highest possible throwing power. Another object of the invention is to provide coatings obtained with such coating materials which after baking are smooth, glossy and hard, a favorable ratio of hardness to impact strength, and exhibit good adhesion to the substrate and to any coatings applied thereto as well as good salt spray resistance i.e. properties which are particularly important for automobile body primers.

In accordance with this invention coating materials for the production of coatings of metal substrates by electrodeposition followed by baking at from 100° to 200° C. contain (as binder dissolved or dispersed in water partly in the form of salts of ammonia or a volatile water-soluble organic amine) a mixture of:

(I) from 10 to 50% by weight of at least one conventional phenolic resin; and
(II) from 50 to 90% by weight of a copolymer which contains:
(A) 50 to 85% by weight of units of at least one ester of acrylic acid or methacrylic acid with an alcohol having one to ten carbon atoms;
(B) 5 to 20% by weight of units of at least one oil containing at least one olefinically unsaturated fatty acid;
(C) 5 to 15% by weight of units of at least one copolymerizable $\alpha,\beta$-olefinically unsaturated carboxylic acid having three to five carbon atoms;
(D) 3 to 20% by weight of units of acrylamide and/or methacrylamide and/or methylolacrylamide and/or methylolmethacrylamide and/or an ether of methylolacrylamide and/or methylolmethacrylamide with an alcohol having one to eight carbon atoms; with or without (E) up to 20% by weight of units of at least one other copolymerizable olefinically unsaturated compound.

The baths containing the coating agents according to this invention are distinguished particularly by good throwing power, insensitivity to voltage changes and good stability. Coatings prepared therewith have good flow and a very favorable ratio of hardness to impact strength. They are for example particularly suitable for priming automobile bodies and exhibit excellent adhesion to fillers and top coatings based not only on oil-modified alkyd-resins but also on pure acrylates.

Suitable components (I) include conventional phenolic resins, i.e. condensation products of phenols and aqueous formaldehyde solution, which have usually been prepared from phenols and substituted phenols, for example phenol, cresol, xylenol, 2,2-bis-(p-hydroxyphenyl)-propane and aqueous formaldehyde solution in the presence of a conventional basic catalyst, for example ammonia or a water-soluble amine (cf. for example K. Hultzsch, "Chemie der Phenolharze," Springer-Verlag 1950, p. 118). The phenolic resin is contained in the binder according to this invention in an amount of 10 to 50%, preferably 20 to 35%, by weight.

The copolymer (II) of the mixture according to this invention contains, as component (A), 50 to 85%, preferably 55 to 75%, by weight of units of at least one ester of acrylic acid or methacrylic acid with an alcohol which contains one to ten carbon atoms. Suitable esters of acrylic or methacrylic acid are those with linear, branched or cyclic alcohols, for example methanol, ethanol, propanol, n-butanol, isobutanol, tertiary-butanol, amyl alcohol, hexyl alcohol, cyclohexanol, heptanol, octanol, 2-ethylhexanol, nonanol and decanol, and mixtures of these esters. The esters of acrylic acid with n-butanol, isobutanol and methyl methacrylate and mixtures of these esters are particularly suitable.

The copolymer (II) according to the invention contains, as component (B), 5 to 20%, preferably 7 to 15% by weight of units of an oil containing at least one olefinically unsaturated fatty acid. Oils containing at least partly conjugated double bonds or which form conjugated double bonds at from 100° to 200° are particularly suitable. Suitable oils of this type include soybean oil, linseed oil, preferably isomerized linseed oil, tall oil and tall oil distillates which for example consist of a mixture of fatty acid and about 25 to 30% by weight of resin acid, dehydrated castor oil, and castor oil. The content of conjugated double bonds in these unsaturated oils may be established for example according to Kaufmann and Baldes, "Berichte der deutschen chemischen Gesellschaft," 70th year, 1937, p. 903, by determining the diene number. The unsaturated oils which are preferably used according to the invention generally have a diene number of more than 5, preferably of more than 10. Ricinoleic acid contained in castor oil may be converted by eliminating water into a fatty acid having two conjugated double bonds.

Other isolated double bonds, in addition to the two double bonds which are in conjugation, may be contained in the oils preferably used. Isomerized linseed oil having a diene number of from 10 to 30 and/or tall oil having a diene number of from 10 to 15 have proved to be particularly suitable for the coating materials according to this invention.

The copolymer (II) contains, as component (C), 5 to 15%, preferably 7 to 12%, by weight of units of at least one copolymerizable α,β-olefinically unsaturated carboxylic acid having three to five atoms. Acrylic and methacrylic acid are preferred; other suitable acids include itaconic acid, citraconic acid, mesaconic acid and maleic acid as well as their hemiesters and maleic anhydride.

The copolymer (II) contains, as component (D), 3 to 20%, preferably 5 to 15%, by weight of units of acrylamide and/or methacrylamide and/or methylolacrylamide and/or methylolmethacrylamide and/or an ether of methylolacrylamide and/or methylolmethacrylamide with an alcohol containing one to eight carbon atoms, for example n-butoxymethylmethacrylamide.

The copolymer (II) may contain, as component (E), up to 20% by weight of units of one or more other copolymerizable olefinically unsaturated compounds. Conventional copolymerizable vinyl compounds are suitable, for example vinyl esters, such as vinyl pivalate, vinyl versatate and particularly vinylaromatics, for example styrene, vinyltoluene and p-chlorostyrene as well as acrylonitrile and methacrylonitrile, and copolymerizable compounds which contain a plurality of double bonds, for example butadiene or isoprene.

Styrene in an amount of 5 to 15% by weight is particularly suitable as component (E).

Preferred copolymers (II) contain for example 50 to 60% by weight of units of isobutyl acrylate or n-butyl acrylate and 10 to 20% by weight of units of methyl methacrylate or 60 to 70% by weight of units of n-butyl acrylate components (A), 7 to 15% by weight of units of isomerized linseed oil (diene number 20 to 30) or distilled tall oil or castor oil as component (B), 7 to 12% by weight of units of acrylic acid as component (C) and 5 to 15% by weight of units of acrylamide or methacrylamide as component (D).

Production of the copolymer (II) from the individual components is generally carried out by a conventional method, advantageously by solution polymerization, i.e. polymerization is carried out in a solvent in which both the monomers and the polymer are soluble. Examples of suitable solvents are alcohols, ethers and/or ketones or mixtures of these solvents. The boiling points of these suitable solvents or solvent mixtures are advantageously within the range from about 50° to 120° C. Conventional free radical forming polymerization initiators, such as organic peroxides, for example benzoyl peroxide, cyclohexanone peroxide, ditertiary-butyl peroxide, organic hydroperoxides, for example cumene hydroperoxide, and aliphatic azo compounds, for example azodiisobutyronitrile. These polymerization initiators are advantageously used in amounts of from 0.5 to 5% by weight with reference to the total weight of the monomers. The monomers to be polymerized are generally contained in the said solvents or solvent mixtures in a concentration of about 50 to 75% by weight. Solution polymerization is carried out advantageously at temperatures which are in the boiling temperature range of the solutions in order that the heat of reaction can be removed by evaporative cooling. The monomer solution containing the initiator may be polymerized as a whole; it is however more advantageous to begin polymerization first with only a portion of the monomer solution or to place the solvent in a vessel and to add the monomer solution (or the rest of the monomer solution) gradually in order that the heat evolved in the polymerization may be more easily controlled. It is often advantageous to carry out the polymerization in the presence of a small amount of conventional polymerization regulator. Examples of suitable regulators are n-dodecylmercaptan, tertiary-dodecylmercaptan and diisopropylxanthogen disulfide. These regulators are generally used in amounts of from 0.5 to 3% by weight with reference to the total weight of the monomers.

The copolymer (II) usually has a K value, measured by the method of H. Fikentscher, Cellulosechemie 13, 58 (1932), of from 12 to 30, preferably from 15 to 20. The bulk of the solvent is distilled off after the polymerization. Such an amount of ammonia or a volatile organic base is added to the concentrated solution of the copolymer (II), which is still warm, that when it is subsequently diluted with water a stable solution or dispersion is obtained. For this purpose it is necessary to neutralize about one third of the carboxyl groups contained in the copolymer (II). Organic amines which are volatile at baking temperatures of about 170° C., for example trialkylamines which may bear further substituents, for example dimethylethanolamine, are particularly suitable as organic bases.

The copolymer (II), which is partly in the form of its ammonium or amine salt, is mixed with the phenolic resin by stirring in a conventional mixing unit; 50 to 90%, preferably 50 to 80%, by weight of the copolymer (II) is combined with 10 to 50%, preferably 20 to 50%, by weight of phenolic resin (in each case with reference to the solids content).

To prepare an electrodepositable coating material, the mixture according to this invention is diluted with completely demineralized water to an end content of about 10%; conventional additives such as phenolic resins, maleicized alkyd resins, maleicized oils, pigments, antifoaming agents, flow improvers, stabilizers and antioxidants, may also be added.

The metal part to be coated, for example an iron sheet of any desired shape, is made the anode in a bath having the said composition. Deposition is generally carried out at a voltage of 50 to 200 volts. After about one minute to two minutes the metal part is completely covered by a uniform coating. The coating is rinsed with water and then baked for about half an hour at 150° to 190° C. A smooth film having a thickness of at least 15 microns is thus obtained which exhibits great hardness and good resistance to impact by stones. Resistance to corrosion is also excellent.

The following examples illustrate the invention. Parts and percentages given in the examples are by weight.

Production of the phenolic resin

Condensate A.—200 parts of 2,2 - bis - (p - hydroxyphenyl)-propane, 132 parts of 40% aqueous formaldehyde solution and 19.65 parts of dimethylethanolamine are stirred at 70° C. for two hours. A yellowish solution is obtained which has a solids content of 70%.

Condensate B.—A mixture of 223 parts of 37% aqueous formaldehyde 111 parts of phenol, 27.7 parts of 2,2-bis(p-hydroxyphenyl)-propane and 10.3 parts of dimethylethanolamine is stirred under nitrogen for about fifteen hours at 45° C. The condensation product should be capable of being diluted in water in a ratio of at least 3:1 and have a content of free formaldehyde of about 8 to 9% (determined by the hydroxylamine hydrochloride method). The solids content is about 45%.

EXAMPLE 1

A solution of 322 parts of isobutyl acrylate, 53.6 parts of methyl methacrylate, 53.6 parts of isomerized linseed oil (having a diene number of about 25 according to Kaufmann and Baldes), 53.6 parts of acrylamide, 53.6 parts of acrylic acid, 5.36 parts of azodiisobutyronitrile, 10.72 parts of diisopropylxanthogen disulfide in 134 parts of isopropanol is allowed to flow in in the course of two hours into 132 parts of boiling isopropanol, the mixture constantly boiling under reflux. The solids content is tested after another two hours. If it has not reached 65%, 2.68 parts of azodiisobutyronitrile suspended in 12 parts of isopropanol is added and boiling is continued for another four hours. The batch is completely polymerized when a solids content of 65% is reached. About 195 parts of solvent is distilled off, if necessary at slight subatmospheric pressure towards the end. At a final solids content of 85% and after the whole has been cooled to 60° to 70° C., 24.4 parts of dimethylethanolamine is stirred in and the product is mixed with 330 parts of condensate (A). The final solids content is 80%.

A dispersion having a solids content of 12% is prepared by dilution with completely demineralized water. By anodic deposition on deep drawing sheet at 160 volts and two minutes deposition time, a firmly adhering film is obtained which after baking for twenty minutes at 170° C. it hardens into a coating having a thickness of 30 microns which is hard and impact resistant and has a smooth surface. Pendulum hardness (according to König) is 170 seconds, the Erichsen number 8.7, salt spray resistance according to ASTM–B 117–64 about 300 hours. A coating having practically the same mechanical properties and equally good appearance may be prepared under the same conditions on bonderized sheet metal.

The throwing power of the bath is tested in the following equipment:

The metal sheet to be coated is fitted into a U-shaped plastic section in such a way that there is a gap of 3 mm. between the sheet and the inside surface of the section. The whole is introduced into a metal vessel having a rectangular cross section measuring 8 x 3.2 cm. and a height of 25 cm. which is filled with such an amount of bath liquid that the sheet is immersed to a depth of 20 cm. The metal sheet should always occupy the same position in the tank so that the clearance distances between the walls of the tank and the metal sheet are always the same. The sheet metal test specimen is made the anode and the tank the cathode.

In order to determine the throwing power a film is deposited onto the metal sheet at a given constant voltage in a given time and, after baking the thickness of the coating on the rear side of the metal sheet i.e. the side facing the inside surface of the plastic section, is measured at intervals of 2 cm. starting from the bottom edge of the metal sheet. The better the throwing power of the bath, the greater the depth of penetration up the gap, which depth may be a maximum of 20 cm. in the above apparatus. The thicknesses of the coating are a direct measure of the throwing power.

Deposition conditions are as follows:

concentration of bath: 12%
temperature: 25° C.
voltage: 160 volts
deposition period: 120 seconds.

The throwing power of the dispersion in Example 1 is as follows: (The following abbreviations are used throughout: P=depth of penetration in cm.; T=thickness of layer in microns)

| P | 0 | 2 | 4 | 6 | 8 | 10 | 12 | 14 | 16 | 18 | 20 |
|---|---|---|---|---|---|----|----|----|----|----|----|
| T | 27 | 15 | 12 | 10 | 10 | 9 | 8 | 8 | 8 | 8 | 8 |

COMPARATIVE EXAMPLE

In order to compare the throwing power, a copolymer is prepared as described in Example 1 which is free from isomerized linseed oil but otherwise has the same composition as the polymer of Example 1, and is mixed with the condensation product (A) in the same ratio.

The throwing power measured in the said tank is as follows:

| P | 0 | 2 | 4 | 6 | 8 | 10 | 12 | 14 | 16 | 18 | 20 |
|---|---|---|---|---|---|----|----|----|----|----|----|
| T | 33 | 20 | 15 | 15 | 10 | 9 | 7 | <6 | -- | -- | -- |

EXAMPLE 2

6.35 parts of dimethylethanolamine and 134 parts of condensate (B) are added to 165 parts of the copolymer from Example 1.

EXAMPLE 3

A solution is prepared from 275 parts of isobutyl acrylate, 110 parts of methyl methacrylate, 55 parts of the isomerized linseed oil of Example 1, 55 parts of acrylamide, 55 parts of acrylic acid, 110 parts of isopropanol, 5.5 parts of azodiisobutyronitrile and 11 parts of diisopropylxanthogen disulfide. 140 parts of this solution, diluted with 140 parts of isopropanol, is placed in a vessel, boiled and the remainder of the monomer solution is allowed to flow in in the course of two hours. After boiling for another two hours, 2.75 parts of azodiisobutyronitrile (suspended in 10 parts of isopropanol) is added and the whole is boiled under reflux for eight hours. When the solids content has reached 65%, about 180 parts of solvent is distilled off and a highly viscous about 83% resin is obtained.

After 25 parts of dimethylethanolamine has been stirred in, the whole is mixed with 337 parts of condensate (A) and adjusted to a solids content of 75% with isopropanol.

A dispersion having a solids content of 12% is prepared by dilution with completely demineralized water. A film deposited after two minutes at 160 volts on deep-drawing sheet metal is baked for twenty minutes at 170° C. giving a hard impact-resistant coating having a thickness of 25 microns and a smooth surface. Throwing power measured by the standard method of Example 1 is:

| P | 0 | 2 | 4 | 6 | 8 | 10 | 12 | 14 | 16 | 18 | 20 |
|---|---|---|---|---|---|----|----|----|----|----|----|
| T | 25 | 20 | 18 | 15 | 13 | 12 | 11 | 10 | 10 | 10 | 10 |

COMPARATIVE EXAMPLE

For comparison purposes a copolymer is prepared as described in Example 3 which is free from isomerized linseed oil but otherwise has the same composition.

The throwing power is as follows:

| P | 0 | 2 | 4 | 6 | 8 | 10 | 12 | 14 | 16 | 18 | 20 |
|---|---|---|---|---|---|----|----|----|----|----|----|
| T | 33 | 20 | 15 | 13 | 10 | 9 | <6 | -- | -- | -- | -- |

EXAMPLE 4

100 parts of the copolymer of Example 3 is mixed with 3.78 parts of dimethylethanolamine and 79 parts of condensate (B).

EXAMPLE 5

A mixture of 600 parts of n-butyl acrylate, 100 parts of methyl methacrylate, 100 parts of the isomerized linseed oil of Example 1, 100 parts of acrylamide, 100 parts of acrylic acid, 300 parts of isopropanol, 10 parts of azodiisobutyronitrile and 10 parts of diisopropylxanthogen disulfide is allowed to flow into 240 parts of boiling isopropanol in the course of three hours. Boiling is continued for another six hours during which a total of 5 parts of azodiisobutyronitrile is added in portions. The solids content is 65%. After the concentration has been increased to a solids content of about 90% and while still hot, 45.5 parts of dimethylethanolamine and then 613 parts of condensation product (A) are added. The solids content is 81%.

EXAMPLE 6

A solution of 1050 parts of n-butyl acrylate, 150 parts of the isomerized linseed oil of Example 1, 150 parts of acrylamide, 150 parts of acrylic acid, 15 parts of azodiisobutyronitrile and 30 parts of diisopropylxanthogen disulfide in 450 parts of isopropanol is allowed to flow into 360 parts of boiling isopropanol in the course of ninety minutes in such a way that the mixture constantly boils under reflux. After another two hours, a total of 7.5 parts of azodiisobutyronitrile is added in portions in the course of fourteen hours. The solids content of the solution is then 65%. After distilling off isopropanol to a solids content of 80%, the product is mixed while still warm with 68.2 parts of dimethylethanolamine and 920 parts of condensation product (A). The final solids content is 78%.

Films deposited from the aqueous dispersion prepared according to Example 6 give coatings having the same physical properties; the throwing power of the bath is just as good as that of the bath of Example 1.

EXAMPLE 7

750 parts of the 80% copolymer of Example 6 is mixed with 27.25 parts of dimethylethanolamine and 563 parts of condensation product (B).

EXAMPLE 8

A mixture of 140 parts of n-butyl acrylate, 20 parts of castor oil, 20 parts of acrylamide, 20 parts of acrylic acid, 72 parts of isopropanol and 2 parts of benzoyl peroxide is allowed to drip into 60 parts of boiling isopropanol in the course of two hours. Polymerization is over after boiling under reflux for twelve hours. Such an amount of solvent is distilled off that the solids content is about 85% and the product is mixed while still warm with 8.35 parts of dimethylethanolamine and 122 parts of condensation product (A).

EXAMPLE 9

60 parts of the 85% copolymer of Example 8 is mixed with 2.8 parts of dimethylethanolamine and 25.6 parts of condensation product (B).

EXAMPLE 10

A mixture is prepared from 412 parts of isobutyl acrylate, 165 parts of methyl methacryate, 82.5 parts of acrylamide, 82.5 parts of a distilled tall oil (e.g. Fractol F 18–30, product of Messrs. Thörl, Hamburg-Harburg, having a diene number of 12), 62.5 parts of acrylic acid, 213 parts of isopropanol, 8.3 parts of azodiisobutyronitrile and 16.5 parts of diisopropylxanthogen disulfide.

210 parts of this mixture is diluted with 210 parts of isopropanol and boiled. The remainder of the monomer solution is allowed to flow in the course of two hours and the whole is then boiled for another two hours. 4.1 parts of azodiisobutyronitrile (suspended in 15 parts of isopropanol) is then added and polymerization is effected until a solids content of 65% has been reached.

Solvent is distilled off to a solids content of about 84% and the product is mixed with 36 parts of dimethylethanolamine and 495 parts of condensate (A). The final solids content is 80%. An aqueous bath is prepared as described in Example 1 and its throwing power is measured by the standard method:

| P | 0 | 2 | 4 | 6 | 8 | 10 | 12 | 14 | 16 | 18 | 20 |
|---|---|---|---|---|---|----|----|----|----|----|----|
| T | 27 | 24 | 20 | 17 | 14 | 10 | 9 | 9 | 9 | 9 | 9 |

The film baked at 170° C. for twenty minutes is glossy and has excellent flow properties. The pendulum hardness is 147 seconds and adhesion to the metal sheet is very good. A film having a thickness of 27 microns on bonderized metal sheet does not show any sign of attack after 250 hours in the salt spray test according to ASTM-B 117-64.

EXAMPLE 11

210 parts of a mixture of 480 parts of isobutyl acrylate, 80 parts of methyl methacrylate, 80 parts of linseed oil, 80 parts of acrylamide, 80 parts of acrylic acid, 8 parts of azodiisobutyronitrile and 16 parts of diisopropylxanthogen disulfide in 200 parts of isopropanol is placed in a vessel, the same weight of isopropanol is added and the whole is boiled. As soon as polymerization has commenced, the remainder of the monomer solution is allowed to flow in the course of two hours and boiling is continued for another two hours. Then 4 parts of azodiisobutyronitrile in 20 parts of isopropanol is again added and heating is continued until the solids content is 65%. After concentration of a solid content of 85%, 37 parts of dimethylethanolamine and 495 parts of condensate (A) are added and the whole is stirred at 80° C. for four hours. The final solids content is 85%.

A 12% aqueous bath is prepared as described in Example 1. It has a pH value of 7.1. At a voltage of 160 volts and at 30° C. there is deposited within two minutes on deep-drawing metal shet a film which after having been baked (twenty minutes at 170° C.) gives a coating 23 microns in thickness which adheres very well to the substrate, is fingernail scratch resistant, and has outstanding flow properties a pendulum hardness of 167 seconds. The salt spray resistance according to ASTM-B 117-64 is 250 hours. The throwing power measured by the standard method is comparable to that in Example 1.

EXAMPLE 12

A mixture of 480 parts of isobutyl acrylate, 80 parts of methyl methacrylate, 80 parts of isomerized linseed oil, 80 parts of butoxymethyl methacrylamide, 80 parts of acrylic acid, 8 parts of azodiisobutyronitrile and 16 parts of diisopropylxanthogen disulfide in 410 parts of isopropanol in polymerized analogously to Example 11, worked up and mixed with dimethylethanolamine and condensate (A).

The bath has a pH value of 7.4. Deposition is effected at 30° C. and 160 volts for two minutes. The film which has been baked for twenty minutes at 170° C. is 20 microns in thickness, fingernail scratch resistant, does not flake when bent and has a pendulum hardness of 167 seconds and an Erichsen number of 9.5. The salt spray resistance according to ASTM–B 117–64 is about 300 hours and the throwing power is about the same as in Example 10.

EXAMPLE 13

A mixture corresponding to the monomer mixture of Example 1 but containing the same amount of styrene instead of methyl methacrylate is polymerized, worked up, mixed with dimethylethanolamine and condensate (A) and diluted with completely demineralized water as described in Example 1.

After anodic deposition for two minutes at 30° C. and 160 volts and baking for twenty minutes at 170° C., a glossy, smooth film having a thickness of 27 microns is obtained having very good flow properties, a pendulum hardness of 170 seconds and an Erichsen number of 7.8. The throwing power of the bath is as good as that in Example 1 and the salt spray resistance on deep-drawing metal sheet is about 300 hours.

EXAMPLE 14

452 parts of the copolymer of Example 5 is mixed with 16.7 parts of dimethylethanolamine and 131 parts of condensation product (A). The final solids content is 79.4%.

A film deposited anodically as described in Example 1 and baked for twenty minutes at 170° C. has very good flow properties and high gloss. The film has a pendulum hardness of 195 seconds and exhibits very good adhesion to the metal sheet.

EXAMPLE 15

A mixture of 180 parts of isobutyl acrylate, 30 parts of the isomerized linseed oil of Example 1, 15 parts of methyl methacrylate, 15 parts of styrene, 30 parts of acrylamide, 30 parts of acrylic acid, 71 parts of isopropanol, 3 parts of azodiisobutyronitrile and 6 parts of diisopropylxanthogen disulfide is allowed to drip into 81 parts of boiling isopropanol in the course of two hours. After two hours a total of 15 parts of azodiisobutyronitrile in 10 parts of isopropanol is added in portions. Polymerization is continued for about another five hours. The solids content is 64%. The resin is concentrated to 84.5%. Then 13.7 parts of dimethylethanolamine is stirred into the resin and 184 parts of condensate (A) is mixed in.

After the coating (deposited as described in the foregoing examples) has been baked, a very hard, glossy coating exhibiting excellent adhesion and elasticity is obtained.

EXAMPLE 16

A mixture of 180 parts of isobutyl acrylate, 30 parts of isomerized linseed oil, 30 parts of methyl methacrylate, 66.7 parts of methylolmethacrylamide (45% in isopropanol), 30 parts of acrylic acid, 3 parts of azodiisobutyronitrile, 6 parts of diisopropylxanthogen disulfide in 115.3 parts of isopropanol is polymerized, concentrated and mixed with dimethylethanolamine and condensate (A) analogously to Example 15.

The resultant anodically deposited and baked film has very good flow properties and is glossy and very hard. The pendulum hardness is 191 seconds and the Erichsen number is more than 10.

We claim:
1. A coating material for the production of coatings on metal substrates by electrodeposition followed by baking at 100° to 200° C. which contains, as the binder dissolved or dispersed in water partly in the form of a salt with ammonia or a water-soluble organic amine which is volatile at the baking temperature, a mixture consisting essentially of:
  (I) 10 to 50% by weight of at least one resole phenolic resin; and
  (II) 50 to 90% by weight of a copolymer of
    (A) 50 to 85% by weight of at least one ester of acrylic or methacrylic acid with an alcohol having one to ten carbon atoms;
    (B) 5 to 20% by weight of at least one oil containing at least one olefinically unsaturated fatty acid;
    (C) 5 to 15% by weight of at least one copolymerizable α,β-olefinically unsaturated carboxylic acid having three to five carbon atoms; and
    (D) 3 to 20% by weight of at least one compound selected from the group consisting of acrylamide, methacrylamide, methylolacrylamide and methylolmethacrylamide and ethers of methylolacrylamide and methylolmethacrylamide with alcohols having one to eight carbon atoms,
  the sum of the percentages given under (A) to (D) being 100%.

2. A coating material as claimed in claim 1 containing linseed oil as component (B) of the copolymer (II).

3. A coating material as claimed in claim 1 containing at least partly isomerized linseed oil as component (B) of the copolymer (II).

4. A coating material as claimed in claim 1 containing tall oil as component (B) of the copolymer (II).

5. A coating material as claimed in claim 1 containing castor oil as component (B) of the copolymer (II).

6. A coating material as claimed in claim 1 wherein the copolymer (II) contains, as component (A), 60 to 70% by weight of butyl or isobutyl acrylate.

7. A coating material as claimed in claim 1 wherein the copolymer (II) contains, as component (A), a mixture of 50 to 70% by weight of bptyl or isobutyl acrylate and 20 to 5% by weight of methyl methacrylate, the sum of the percentages given under (A) to (E) being 100.

8. A coating material as claimed in claim 1 wherein copolymer (II) contains as component (E), from 5 to 10% by weight of styrene.

9. A coating material as claimed in claim 1 wherein copolymer (II) contains 10% by weight of component (B).

10. A coating material as claimed in claim 1 wherein copolymer (II) contains 5 to 15% by weight of acrylamide or methacrylamide.

11. A coating material as claimed in claim 1 wherein the component (B) contained in copolymer (II) has a diene number of 5 to 30.

12. A coating material as claimed in claim 1 wherein said binder is a mixture consisting essentially of:
  (I) 20 to 50% by weight of at least one resole phenolic resin; and
  (II) 50 to 80% by weight of a copolymer of
    (A) 55 to 75% by weight of at least one ester of acrylic or methacrylic acid with an alcohol having one to four carbon atoms;
    (B) 7 to 15% by weight of at least one oil containing an olefinically unsaturated fatty acid selected from the group consisting of linseed oil, at least partly isomerized linseed oil, tall oil and castor oil;
    (C) 7 to 12% by weight of acrylic acid;
    (D) 5 to 15% by weight of a compound selected from the group consisting of acrylamide, methacrylamide, methylolacrylamide, methylolmethacrylamide and ethers of methylolacrylamide and methylolmethacrylamide with alcohols having one to eight carbon atoms; and (E) up to 20% by weight of at least one other copolymerizable olefinically unsaturated compound selected from the group consisting of styrene, vinyltoluene, p-chlorostyrene, acrylonitrile, methacrylonitrile, butadiene, isoprene, vinyl pivalate and vinyl versatate, the sum of the percentages given under (A) to (E) being 100%.

13. The coating material as claimed in claim 1 which has been electrodeposited onto a metal substrate and baked at 100° to 200° C.

References Cited

UNITED STATES PATENTS

| 3,206,421 | 9/1965 | Victorious | 260—29.3 |
| 3,440,188 | 4/1969 | Burdick et al. | 260—29.3 |
| 3,485,075 | 12/1969 | Schmitt | 260—29.3 |

FOREIGN PATENTS

| 1,414,174 | 9/1965 | France. |
| 1,504,895 | 10/1967 | France. |
| 1,506,950 | 11/1967 | France. |
| 1,506,951 | 11/1967 | France. |

DONALD E. CZAJA, Primary Examiner

W. E. PARKER, Assistant Examiner